United States Patent [19]

Ito et al.

[11] Patent Number: 5,237,416
[45] Date of Patent: Aug. 17, 1993

[54] APPARATUS FOR REMOVING WAVEFORM DISTORTION FROM A VIDEO SIGNAL

[75] Inventors: Shigehiro Ito, Toride; Tatsushi Koguchi; Yuji Nishi, both of Iwai; Kazuyuki Ebihara, Toride, all of Japan

[73] Assignee: Victor Company of Japan, Ltd., Japan

[21] Appl. No.: 876,639

[22] Filed: Apr. 30, 1992

Related U.S. Application Data

[62] Division of Ser. No. 595,139, Oct. 10, 1990.

[30] Foreign Application Priority Data

| Oct. 18, 1989 | [JP] | Japan | 1-271164 |
| Oct. 18, 1989 | [JP] | Japan | 1-271165 |
| Oct. 18, 1989 | [JP] | Japan | 1-271166 |
| Oct. 18, 1989 | [JP] | Japan | 1-271167 |

[51] Int. Cl.⁵ .................................................. H04N 5/21
[52] U.S. Cl. ...................................... 358/167; 358/905
[58] Field of Search ................ 358/167, 166, 36, 905; 333/18; 375/12, 14

[56] References Cited

U.S. PATENT DOCUMENTS

| 4,344,089 | 8/1982 | Utsunomiya et al. | 358/905 |
| 4,389,623 | 6/1983 | Onishi et al. | 333/18 |
| 4,413,282 | 11/1983 | Wargo | 358/167 |
| 4,477,913 | 10/1984 | Koya et al. | 333/18 |
| 4,564,952 | 1/1986 | Karabinis et al. | 333/18 |
| 5,144,414 | 9/1992 | Nishi et al. | 358/36 |

Primary Examiner—James J. Groody
Assistant Examiner—Jeffrey S. Murrell
Attorney, Agent, or Firm—Lowe, Price, LeBlanc & Becker

[57] ABSTRACT

A waveform distortion removing apparatus includes a digital filter having taps and being controlled in response to tap coefficients. An error signal sequence is generated from a video signal. The error signal sequence contains a waveform distortion. A quadrature signal is generated which has a quadrature relation with the error signal sequence. An absolute value of the quadrature signal is derived. The absolute value of the error signal sequence and the absolute value of the quadrature signal are compared with each other. A greater of the absolute values is selected. The tap coefficients are set in dependence upon the selected greater of the absolute values.

4 Claims, 15 Drawing Sheets

BAR PULSE

OUTPUT FROM CIRCUIT 22

REFERENCE WAVEFORM $r_n$

ERROR SIGNAL SEQUENCE $\varepsilon_n$

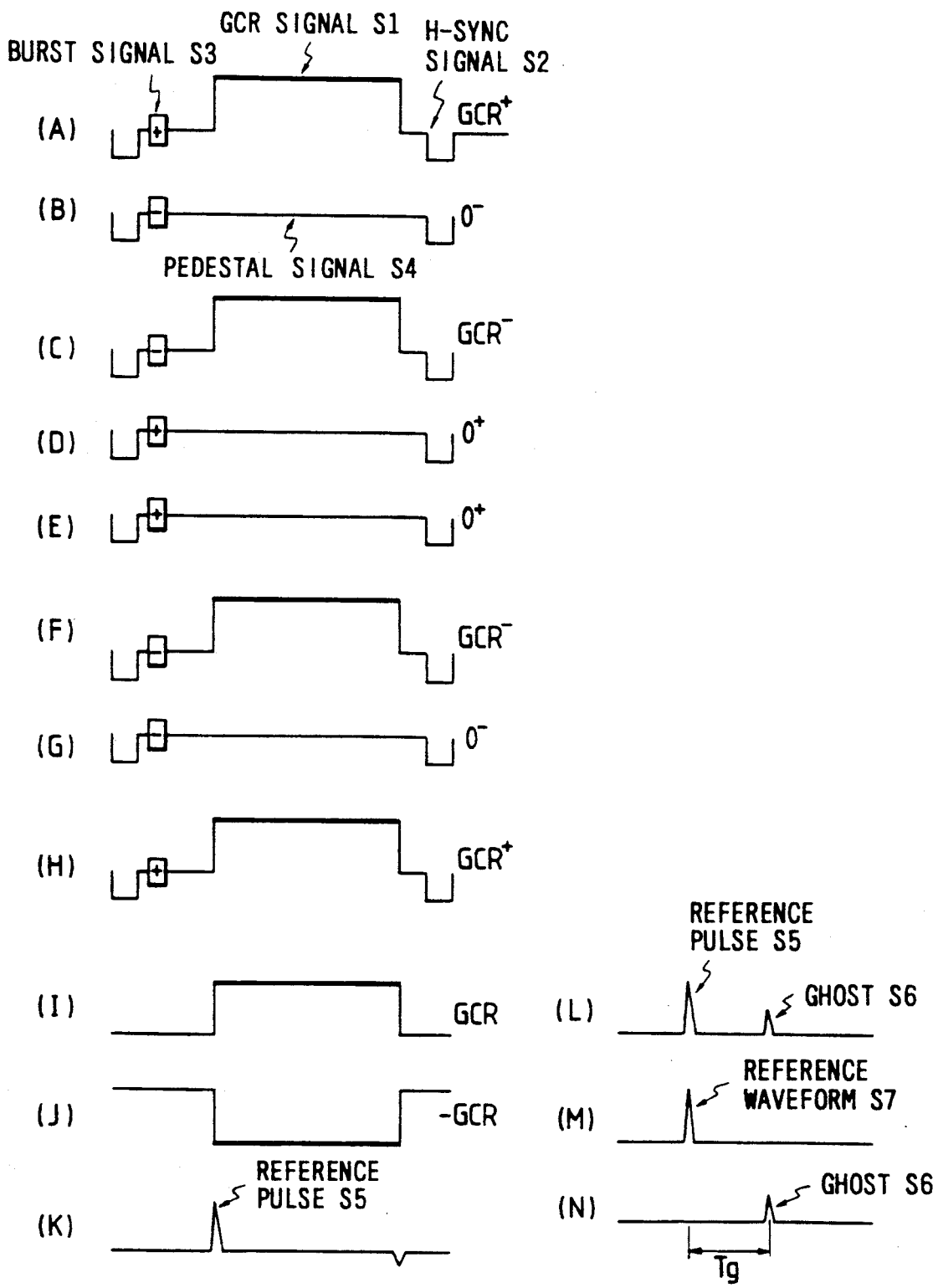

EVEN FIELD

ODD FIELD

FIG. 11(B)
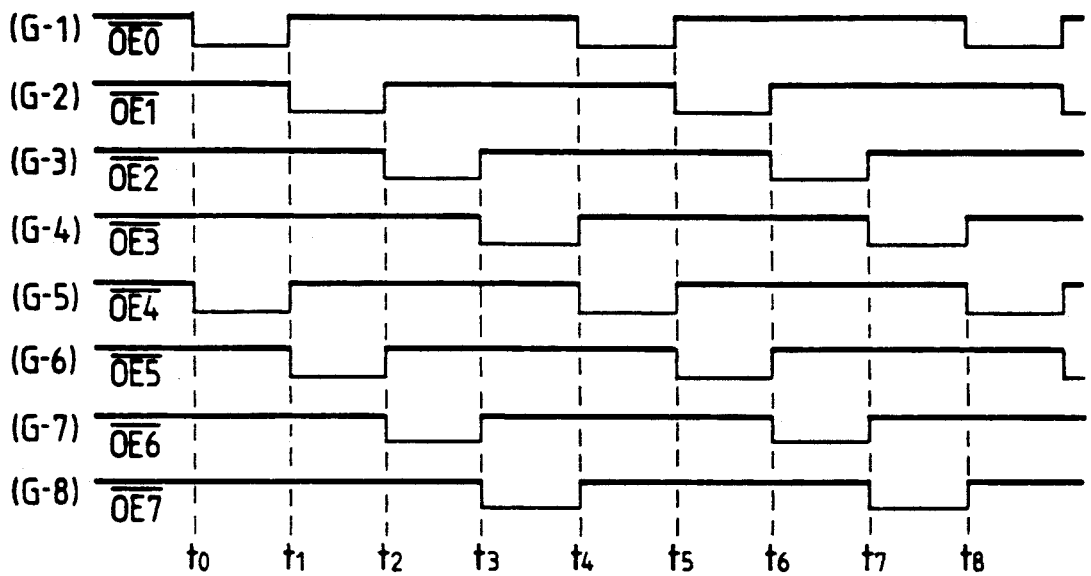
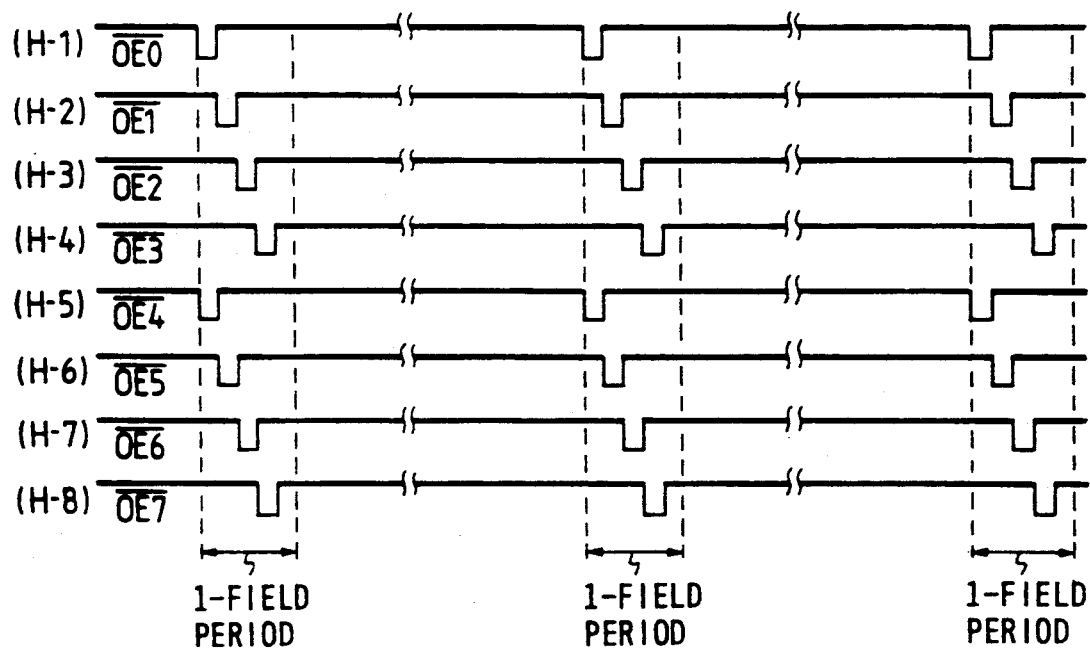
1-FIELD PERIOD   1-FIELD PERIOD   1-FIELD PERIOD FIG. 14(A)
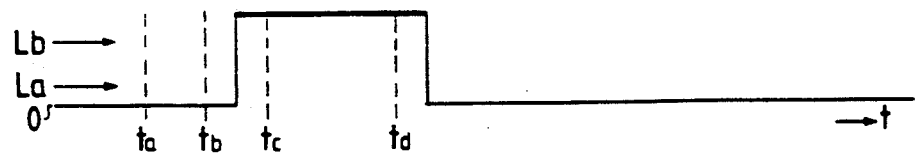
FIG. 14(B)
FIG. 14(C)
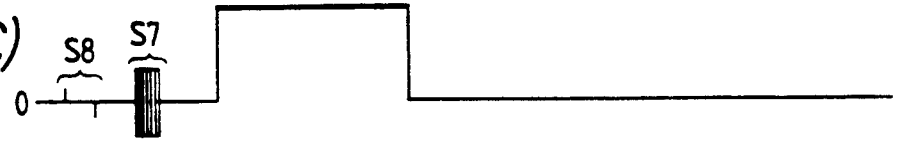
FIG. 14(D)
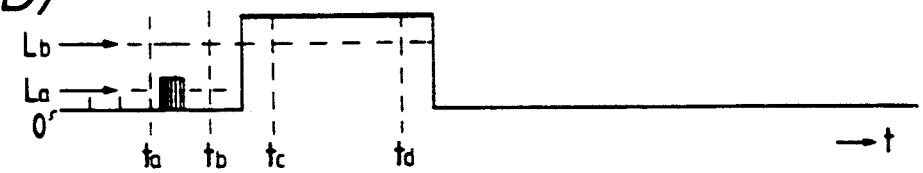
FIG. 14(E)
FIG. 14(F)
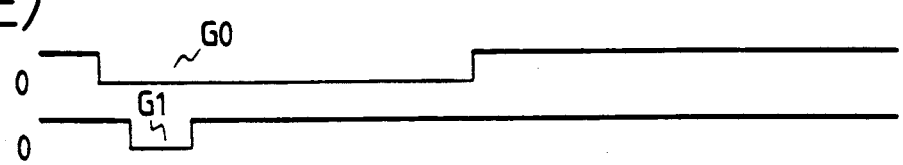
FIG. 14(G)
FIG. 14(H)
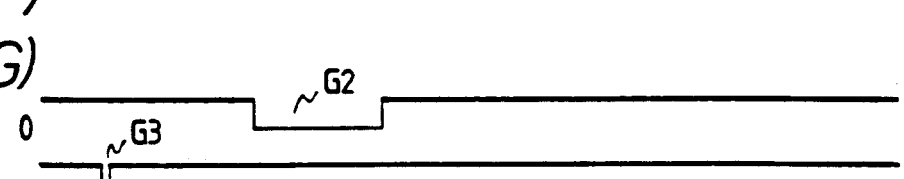
FIG. 14(I)
FIG. 14(J)
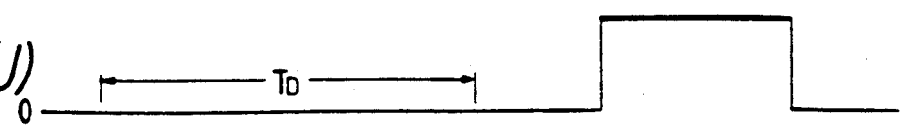

APPARATUS FOR REMOVING WAVEFORM DISTORTION FROM A VIDEO SIGNAL

This application is a division of application Ser. No. 07/595,139 filed Oct. 10, 1990.

BACKGROUND OF THE INVENTION

This invention relates to a waveform distortion removing apparatus such as a ghost canceling apparatus in a video system or a television receiver.

Conventional ghost canceling apparatuses use digital transversal filters. In the conventional apparatuses, the digital transversal filter tends to require a large number of taps to adequately remove different-phase ghost components. Generally, a digital filter having a large number of taps is expensive.

SUMMARY OF THE INVENTION

It is an object of this invention to provide an improved waveform distortion removing apparatus.

According to a first aspect of this invention, a waveform distortion removing apparatus comprising a digital filter having taps and being controlled in response to tap coefficients, means for generating an error signal sequence from a video signal, the error signal sequence containing a waveform distortion, and means for setting the tap coefficients in response to an absolute value of the error signal sequence; the improvement comprising means for generating a quadrature signal which has a quadrature relation with the error signal sequence; means for deriving an absolute value of the quadrature signal; means for comparing the absolute value of the error signal sequence and the absolute value of the quadrature signal, and for selecting a greater of the absolute values; and means for setting the tap coefficients in dependence upon the selected greater of the absolute values.

A second aspect of this invention provides a waveform distortion removing apparatus for processing a video signal having a reference line signal containing a ghost cancel component, wherein the reference line signal periodically occurs for each field and a state of the reference line signal periodically varies at a period of a predetermined number of fields, the apparatus comprising a digital filter having taps and being controlled in response to tap coefficients, means for extracting the reference line signal from the video signal, and means for setting the tap coefficients in response to the extracted reference line signal; the improvement wherein the extracting means comprises a predetermined number of memories, wherein the number of the memories is equal to the number of the fields composing one period of the variation in the state of the reference line signal; means for sequentially writing the reference line signals of the fields composing one period into the memories respectively; and means for reading the reference line signals from the memories.

A third aspect of this invention provides a waveform distortion removing apparatus for processing a video signal having a ghost cancel reference signal which periodically occurs, the apparatus comprising a digital filter having taps and being controlled in response to tap coefficients, means for extracting the reference signal from the video signal, and means for setting the tap coefficients in response to the extracted reference signal; the improvement comprising means for detecting an abnormality of the extracted reference signal; and means for suspending an operation of the coefficient setting means when the detecting means detects an abnormality of the extracted reference signal.

According to a fourth aspect of this invention, an apparatus comprises an input terminal subjected to a video signal; an output terminal; a ghost canceler; first means changeable between a first state and a second state for transmitting the video signal from the input terminal to the ghost canceler and transmitting an output signal from the ghost canceler to the output terminal when being in the first state, and for transmitting the video signal from the input terminal to the output terminal and causing the video signal to bypass the ghost canceler when being in the second position; and second means for changing the first means between the first state and the second state.

BRIEF DESCRIPTION OF THE DRAWINGS

FIGS. 7A-7N are timing diagrams showing the waveforms of a given line of a video signal which contains a ghost cancel reference signal, and the waveforms of various signals in a second embodiment of this invention.

FIGS. 11(a) and 11(b) are timing diagrams showing the waveforms of various signals in the waveform extracting circuit of FIG. 10.

FIGS. 14A-14J are timing diagrams showing the waveforms of various signals in the apparatus of FIG. 12.

DESCRIPTION OF THE FIRST PREFERRED EMBODIMENT

Figure 1:
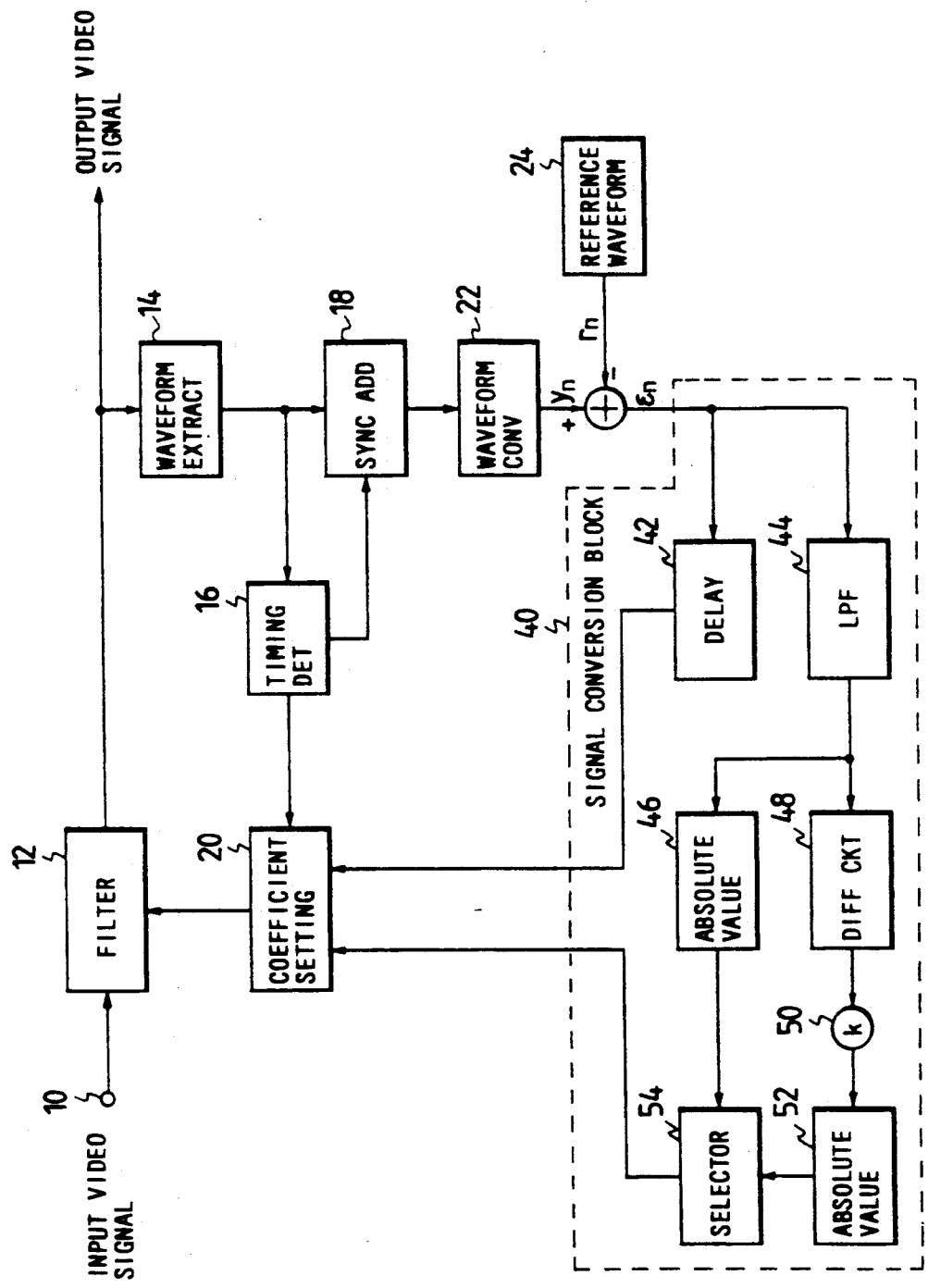
FIG. 1 is a block diagram of a waveform distortion removing apparatus according to a first embodiment of this invention.
Figure 2A:
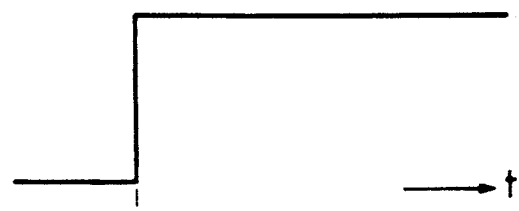
FIGS. 2A-2D are timing diagrams showing the waveforms of various signals in the apparatus of FIG. 1.
Figure 2B:
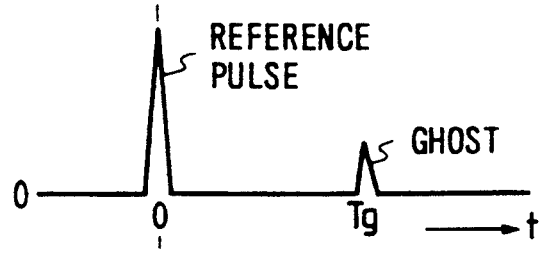
Figure 2C:
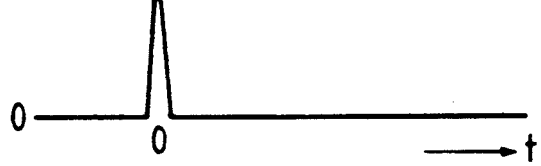
Figure 2D:
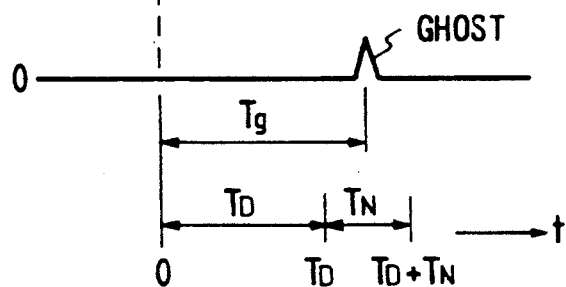

With reference to FIG. 1, a digitized video signal is fed to a digital transversal filter 12 via an input terminal 10. The digitized video signal is derived from an analog video signal by analog-to-digital conversion using a given sample frequency, for example, four times a color subcarrier frequency fsc. The transversal filter 12 processes the input video signal with a filtering characteristic to remove ghost components from the video signal. The filtering characteristic is determined by a delay time and a set of tap coefficients fed from a coefficient setting circuit 20. It should be noted that tap coefficients will be also simply referred to as coefficients hereinafter. The substantially ghost-free video signal is outputted from the transversal filter 12 to an external circuit (not shown) and also to a waveform extracting circuit 14.

The waveform extracting circuit 14 extracts a waveform of the output signal of the transversal filter 12 which occurs during a predetermined period where a reference signal for ghost cancel is present but display information components are absent. For example, this period is one horizontal scanning period in a vertical blanking period. In general, the ghost cancel reference signal is a vertical sync signal, an edge of a wide bar pulse or a short pulse in a predetermined line in a vertical blanking period. In this embodiment, the ghost cancel reference signal is the rising edge of a wide bar pulse. The part (A) of FIG. 2 shows the waveform of a wide bar pulse. Although the output signal from the transversal filter 12 is digital, a wide bar pulse in the output signal from the transversal filter 12 is illustrated as having an analog waveform for an easy understanding in the drawing. For similar reasons, in other parts of FIG. 2, digital signals are illustrated as having analog waveforms.

A timing detector 16 detects a timing of the rising edge of a bar pulse (see the part (A) of FIG. 2) by processing the output signal from the waveform extracting circuit 14. Specifically, the timing detector 16 is designed so as to detect the central point of the rising edge of a bar pulse on the basis of a 1-sample or 2-sample differentiating process. The timing detected by the timing detector 16 is used by a subsequent stage as a time reference or a time position of the reference signal.

By using the fact that wide bar pulses are periodically extracted by the waveform extracting circuit 14 for respective fields or frames, a sync adder 18 adds the output signals from the waveform extracting circuit 14 and calculates an average of the output signals from the waveform extracting circuit 14 while adjusting the time positions of the output signals from the waveform extracting circuit 14 in response to the timings detected by the timing detector 16. The operation of the sync adder 18 increases the S/N (signal-to-noise) ratio in the waveform extraction or detection of the reference signal.

A waveform converter 22 differentiates the output signal from the sync adder 18 so that a wide bar pulse of the part (A) of FIG. 2 will be converted into a short pulse of the part (B) of FIG. 2. The short pulse of the part (B) of FIG. 2 is in synchronism with the rising edge of a wide bar pulse of the part (A) of FIG. 2.

In the case where some ghost components still remain in the output signal from the transversal filter 12, the output signal yn from the waveform converter 22 contains a reference pulse and its ghost as shown in the part (B) of FIG. 2. The ghost follows the reference pulse by a delay time Tg.

A reference waveform generator 24 determines an original reference waveform rn in advance and outputs a signal representing the original reference waveform. As shown in the part (C) of FIG. 2, the original reference waveform rn substantially agrees with the output reference pulse from the waveform converter 22 in waveform and timing.

A subtracter 26 calculates the difference between the output signals from the waveform converter 22 and the reference waveform generator 24 and outputs an error signal representing the difference between the output signals from the devices 22 and 24. Since the output signals from the devices 22 and 24 are digital and are composed of discrete digital values, the output signal from the subtracter 26 is a sequence of discrete digital error signals which will be referred to as an error signal sequence εn. As shown in the part (D) of FIG. 2, a ghost sometimes remains in the error signal sequence εn.

A signal conversion block 40 converts the error signal sequence εn in order to enable the coefficient setting circuit 20 to easily measure the ghost delay time Tg. The coefficient setting circuit 20 determines a set of coefficients on the basis of the output signals from the signal conversion block 40. In the case where the transversal filter 12 is intended to reliably remove ghost components with a small number of taps (for example, 8-16), the transversal filter 12 is preferably designed so that the following relation can be approximately satisfied.

$$Tg = TD + TN/2 \tag{1}$$

where TD denotes a delay time of a variable delay circuit in the transversal filter 12, and TN denotes a controllable time range of the transversal filter 12. The signal conversion block 40 executes processing of the error signal sequence εn to enable the relation (1) to be approximately satisfied.

The coefficient setting circuit 20 measures the difference Tg between the moment of occurrence of the rising edge of a wide bar pulse and the moment of occurrence of the peak of the error signal sequence εn, that is, the moment of occurrence of the ghost, by referring to the output signals from the timing detector 16 and the signal conversion block 40. Then, the coefficient setting circuit 20 calculates a desired delay time TD which enables the relation (1) to be approximately satisfied. Furthermore, the coefficient setting circuit 20 uses the error signal sequence εn detected for the period TN and calculates a set of coefficients an (n=0~N−1) by referring to the following equations.

$$a_n^{(K+1)} = a_n^{(K)} + \alpha \epsilon n \tag{2}$$

where $a_n^{(K+1)}$ denotes new coefficients; $a_n^{(K)}$ denotes previous coefficients; and α denotes a predetermined magnification smaller than "1". In this way, the new coefficients are determined on the basis of the previous coefficients and the error signal sequence εn by an updating process.

The transversal filter 12 receives the output signals from the coefficient setting circuit 20 which represent the desired delay time TD and the calculated coefficients an (n=0~N−1). The transversal filter 12 processes the input video signal with the filtering characteristic which is determined by the desired delay time TD and the calculated coefficients an (n=0~N−1) fed from the coefficient setting circuit 20. Since the relation (1) is approximately satisfied, ghosts can be reliably removed from the input video signal even when the transversal filter has a small number of taps.

Figure 3:
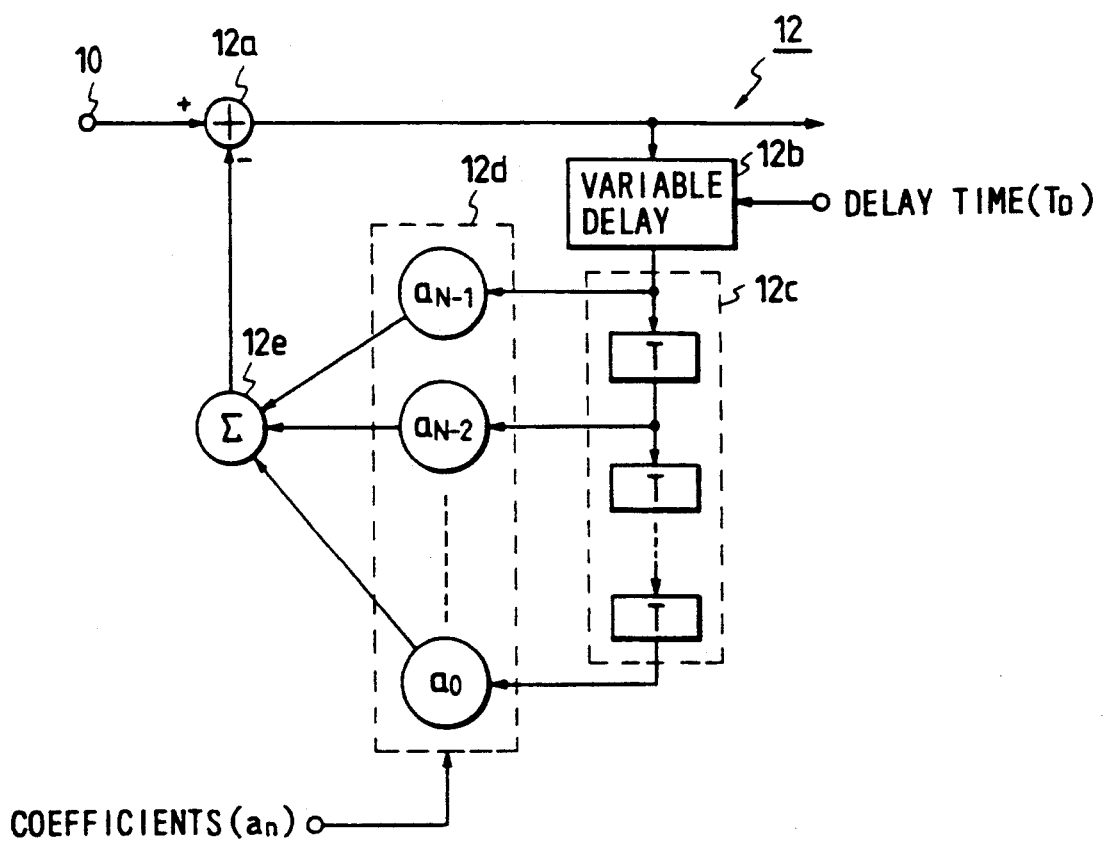
FIG. 3 is a block diagram of the digital transversal filter of FIG. 1.

As shown in FIG. 3, the transversal filter 12 includes a subtracter 12a, a variable delay circuit 12b, a fixed delay circuit 12c, a multiplier set (a coefficient device set) 12d, and an adder 12e. The subtracter 12a subtracts the output signal from the adder 12e from the input video signal. The output signal from the subtracter 12a is used as the output signal from the transversal filter 12. In addition, the output signal from the subtracter 12a is delayed by the variable delay circuit 12b by a time which agrees with the desired delay time TD informed from the coefficient setting circuit 20. The output signal from the variable delay circuit 12b is delayed by the fixed delay circuit 12c. The fixed delay circuit 12c includes a cascade combination of N-stage unit-time delay elements each providing a signal delay corresponding to a unit time T. For example, the unit time T equals ¼ fsc where fsc denotes the color subcarrier frequency. The fixed delay circuit 12c has opposite ends and taps which are connected to multipliers in the coefficient device set 12d respectively. The multipliers in the coefficient device set 12d are fed with the coefficients an (n=0~N−1) from the coefficient setting circuit 20 respectively. The multipliers multiply the signals, which appear at the opposite ends and the taps of the fixed delay circuit 12c, by the coefficients an (n=0~N−1) respectively. The output signals from the multipliers are summed by the adder 12e.

Figure 4:
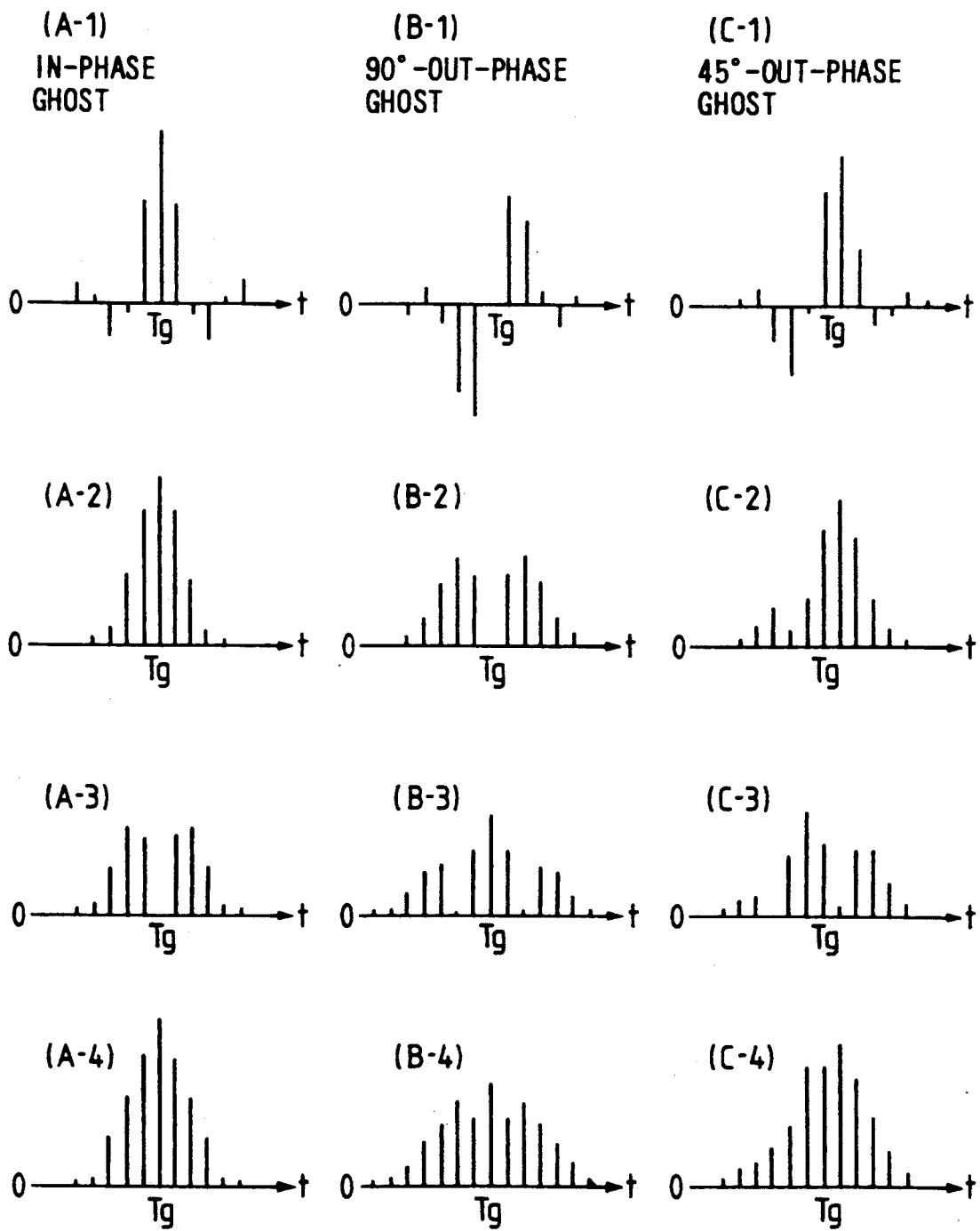
FIG. 4 is a diagram showing the digital values of different-phase ghosts in the apparatus of FIG. 1.

The ghost of the reference signal tends to have various components whose phase relations with the reference signal vary from each other. The part (A-1) of FIG. 4 shows sample values of a ghost component which is in phase with the reference signal. The part (B-1) of FIG. 4 shows sample values of a ghost component which is 90-degrees out of phase with the reference signal. The part (C-1) of FIG. 4 shows sample values of a ghost component which is 45-degree out of phase with the reference signal. Accordingly, the error signal sequence en generally has different-phase ghost components.

As understood from FIG. 4, the moments of the peaks of the out-phase ghost components deviate from the moment of the peak of the in-phase or opposite-phase ghost component by a 1-sample period. Such deviations would decrease the accuracy of the measurement of the ghost delay time Tg. As will be made clear later, the signal conversion block 40 removes such deviations to enable accurate measurement of the ghost delay time Tg.

As shown in FIG. 1, the signal conversion block 40 includes a delay circuit 42, a low pass filter 44, absolute value circuits 46 and 52, a differential circuit 48, a magnification setting circuit 50, and a selector 54. The signal conversion block 40 has first and second sections each receiving the error signal sequence en. The first section includes the delay circuit 42, and the second section includes the devices 44, 46, 48, 50, 52, and 54. The delay circuit 42 in the first section delays the error signal sequence en by a predetermined time which agrees with the signal delay time caused by the signal processing in the second section. The output signal from the delay circuit 42 is fed to the coefficient setting circuit 20.

The error signal sequence en is processed by the low pass filter 44 in the second section. The low pass filter 44 can be composed of a 3-tap transversal filter. The frequency response characteristic of the low pass filter 44 is chosen as expressed by the following equation.

$$L(f) = (\tfrac{1}{2})\{1 + \cos(\pi f/fsc)\} \tag{3}$$

Figure 5:
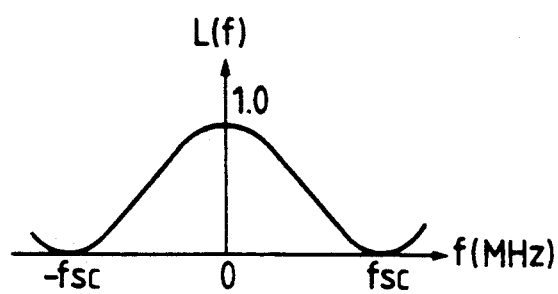
FIG. 5 is a diagram showing the frequency response characteristic of the low pass filter of FIG. 1.

FIG. 5 shows the frequency gain characteristic of the low pass filter 44. The low pass filter 44 functions to increase the S/N ratio. The absolute value circuit 46 derives the absolute value of the output signal from the low pass filter 44. The output signal from the low pass filter 44 is also processed by the differential circuit 48. The differential circuit 48 can be composed of a 2-tap transversal filter. The frequency response characteristic of the differential circuit 48 is chosen as expressed by the following equation.

$$D(f) = \sin(\pi f/fsc) \tag{4}$$

Figure 6:
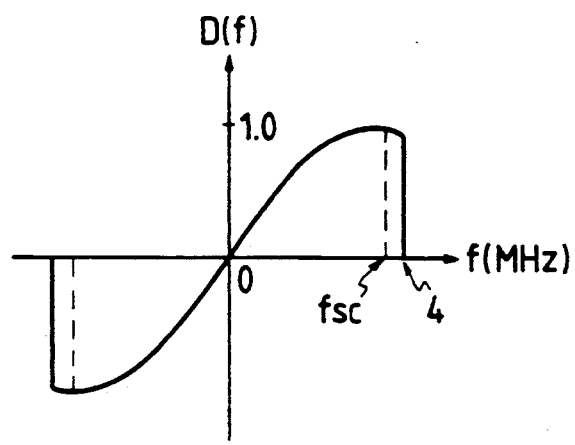
FIG. 6 is a diagram showing the frequency response characteristic of the differential circuit of FIG. 1.

FIG. 6 shows the frequency gain characteristic of the differential circuit 48. The differential circuit 48 functions to derive a signal which equivalently has a quadrature relation with the error signal sequence en. The output signal from the differential circuit 48 is multiplied by a predetermined gain factor "k" by the magnification setting circuit 50. For example, the gain factor "k" is approximately equal to 1.48 and is given by the following equation.

$$k = Sa/Sb \tag{5}$$

where Sa denotes an area of the in-phase transmission characteristic and Sb denotes an area of the differential characteristic. The areas Sa and Sb are given by the following equations.

$$Sa = \pi fo/fsc \tag{6}$$

$$Sb = 2\{1 - \cos(Sa/2)\} \tag{7}$$

where fo denotes a predetermined frequency of, for example, 4 MHz while fsc denotes the color subcarrier frequency, that is, about 3.58 MHz. The absolute value circuit 52 derives the absolute value of the output signal from the magnification setting circuit 50. The selector 54 selects the greater of the output signals from the absolute value circuits 46 and 52, and transmits the selected signal to the coefficient setting circuit 20. For example, the selector 54 includes a combination of a comparator and a data selector.

In the case where an in-phase ghost is present in the error signal sequence en at a position corresponding to a moment t=Tg as shown in the part (A-1) of FIG. 4, the output signals from the absolute value circuits 46 and 52 have values as shown in the parts (A-2) and (A-3) of FIG. 4 respectively. In this case, the output signal from the selector 54 has values as shown in the part (A-4) of FIG. 4. As shown in the part (A-4) of FIG. 4, the peak of the output signal from the selector 54 occurs at a moment t=Tg.

In the case where a 90°-out-phase ghost is present in the error signal sequence en at a position corresponding to a moment t=Tg as shown in the part (B-1) of FIG. 4, the output signals from the absolute value circuits 46 and 52 have values as shown in the parts (B-2) and (B-3) of FIG. 4 respectively. In this case, the output signal from the selector 54 has values as shown in the part (B-4) of FIG. 4. As shown in the part (B-4) of FIG. 4, the peak of the output signal from the selector 54 occurs at a moment t=Tg.

In the case where a 45°-out-phase ghost is present in the error signal sequence en at a position corresponding to a moment t=Tg as shown in the part (C-1) of FIG. 4, the output signals from the absolute value circuits 46 and 52 have values as shown in the parts (C-2) and (C-3) of FIG. 4 respectively. In this case, the output signal from the selector 54 has values as shown in the part (C-4) of FIG. 4. As shown in the part (B-4) of FIG. 4, the peak of the output signal from the selector 54 occurs at a moment which separates from a moment t=Tg by a 1-sample period.

As understood from the previous description, the peak of the output signal from the selector 54 occurs at a correct moment t=Tg for an in-phase ghost and also a 90°-out-phase ghost. Accordingly, the coefficient setting circuit 20 can accurately measure the ghost delay time Tg for most of different-phase ghosts. The accurate measurement of the ghost delay time Tg enables reliable removal of a ghost by the transversal filter 12 with a small number of taps. It should be noted that a decrease in the accuracy of the measurement of the ghost delay time Tg generally requires an increase in the number of taps of the transversal filter 12 for good cancel of a ghost.

DESCRIPTION OF THE SECOND PREFERRED EMBODIMENT

In the television signal standards of Japan employed in 1989, a reference signal for ghost cancel is added into a given line in a vertical blanking period. The reference signal includes a GCR signal S1 and a pedestal signal S4. As shown in the parts (A)-(H) of FIG. 7, the GCR signals S1 and the pedestal signals S4 are added into the video signal at intervals of 4 fields in a 4-phase manner. The parts (A), (C), (E), and (G) of FIG. 7 show even fields. The parts (B), (D), (F), and (H) of FIG. 7 show odd fields.

A bar waveform being a reference signal for ghost cancel is given by the GCR signal S1. The pedestal signal S4 is an auxiliary reference signal for extracting the GCR signal S1 by canceling a horizontal sync signals S2 and a burst signal S3 through subtraction.

Figure 8A:
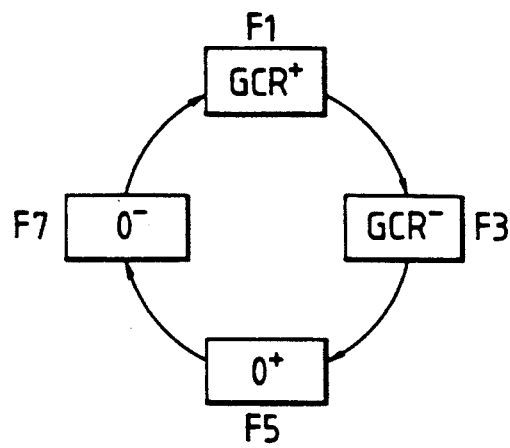
FIGS. 8A-8B are diagrams showing the relation among the field number, the ghost cancel reference signal, and the polarity of the burst signal in the second embodiment.
Figure 8B:
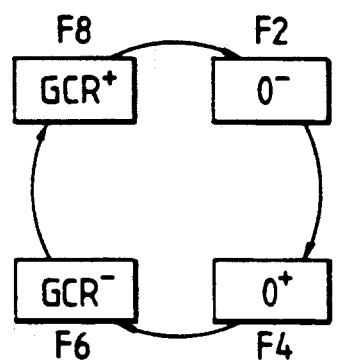

With reference to FIGS. 7 and 8, the GCR signal S1 is added to the first, third, sixth, and eighth fields F1, F3, F6, and F8 while the pedestal signal S4 is added to the second, fourth, fifth, and seventh fields F2, F4, F5, and F7. In these drawings, the GCR signal S1 is denoted as "GCR+" and "GCR−" while the pedestal signal S4 is denoted as "0+" and "0−".

The burst signal is added to every field. The polarity of the burst signal depends on the field as shown by the marks "+" and "−" in FIG. 7. These polarity marks agree with the marks "+" and "−" in the ends of "GCR+", "GCR−", "0+", "0−".

As shown in FIG. 8, the addition of the GCR signal S1 and the pedestal signal S4 to the video signal has a recurrence period of 8 fields. With respect to even fields, one cycle is completed in the following order: the field F1 (GCR+)→the field F3 (GCR−)→the field F5 (0+)→the field F7 (0−)→the field F1 (GCR+). With respect to odd fields, one cycle is completed in the following order: the field F2 (0−)→the field F4 (0+)→the field F6 (GCR−)→the field F8 (GCR+)→the field F2 (0−).

To cancel the horizontal sync signals S2 and the burst signals S3 by subtraction, it is necessary that the polarities of the burst signals S3 are equal. Accordingly, as made clear from FIG. 8, when the subtraction is done between the parts of the video signal which are separated from each other by an interval of 4 fields, the horizontal sync signals S2 and the burst signals S3 are well canceled so that good bar waveforms "GCR" and "−GCR" are extracted (see the parts (I) and (J) of FIG. 7).

To use one of the extracted bar waveforms as a reference signal for ghost cancel, a signal of the extracted bar waveform of the part (I) or (J) of FIG. 7 is differentiated. The differentiation of the signal generates pulses as shown in the part (K) of FIG. 7. The former pulse which corresponds to the rising edge of the bar waveform is used as a reference pulse S5 for ghost cancel. The reference pulse S5 sufficiently has components whose frequencies extend up to 4 MHz.

As shown in the part (L) of FIG. 7, the reference pulse S5 is followed by its in-phase ghost S6. A reference signal S7 designed so as to agree with the reference pulse S5 in waveform and timing is generated (see the part (M) of FIG. 7. When the reference signal S7 is subtracted from the signal of the part (L) of FIG. 7, the reference signal S7 and the reference pulse S5 are canceled each other so that an error signal sequence en containing substantially the ghost signal S6 is obtained (see the part (N) of FIG. 7). The error signal sequence en is used in calculating the delay time Tg of the ghost signal S6 and the amplitude of the ghost signal S6. Ghost cancel is executed by determining tap coefficients of a digital transversal filter on the basis of the calculated ghost delay time and the calculated ghost amplitude.

Figure 9:
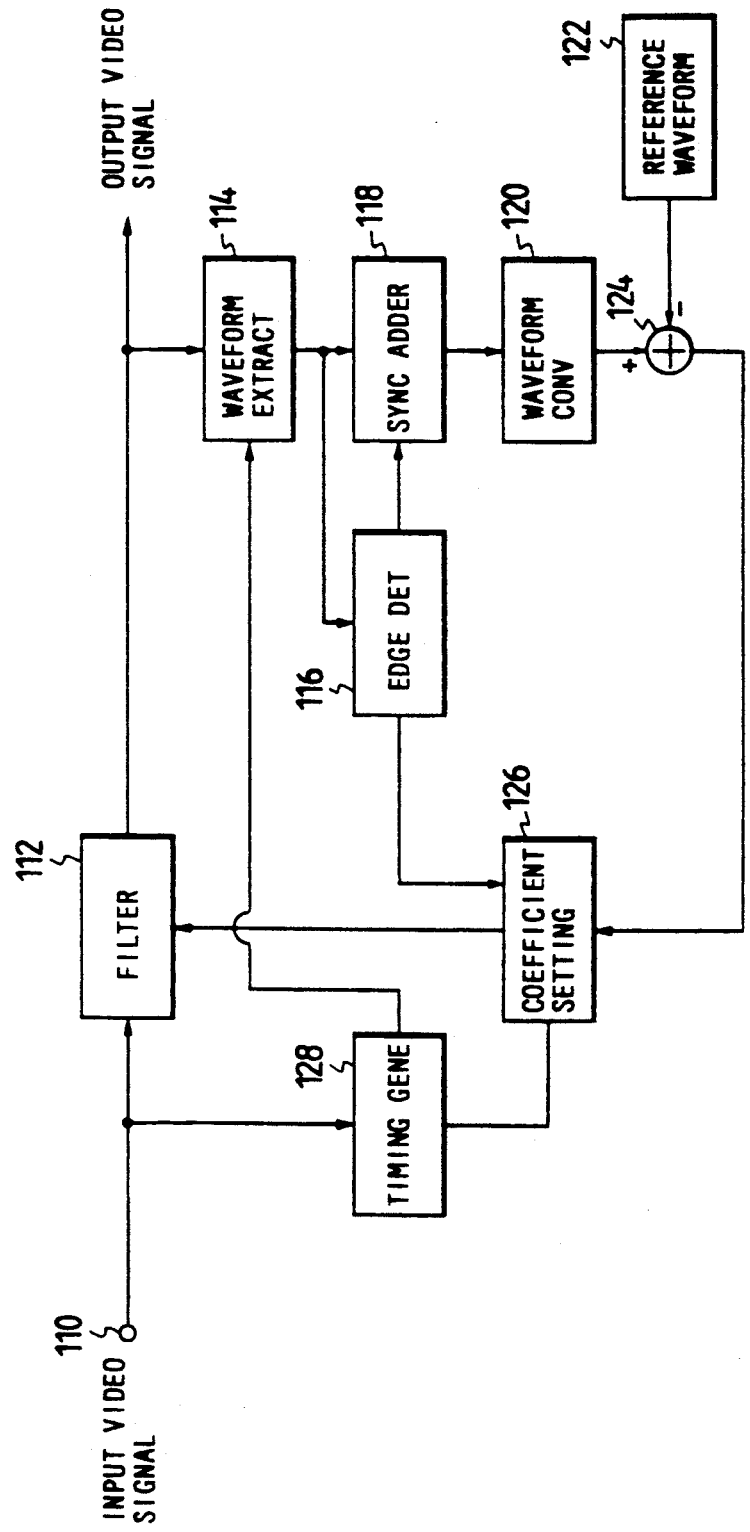
FIG. 9 is a block diagram of a waveform distortion removing apparatus according to the second embodiment of this invention.

With reference to FIG. 9, a digitized video signal is inputted into a digital transversal filter 112 and a timing signal generator 128 via an input terminal 110. The digitized video signal is derived from an analog video signal by analog-to-digital conversion using a given sample frequency, for example, four times a color subcarrier frequency fsc. The transversal filter 112 processes the input video signal with a filtering characteristic to remove ghost components from the video signal. The filtering characteristic is basically determined by a set of tap coefficients fed from a coefficient setting circuit 126. It should be noted that tap coefficients will be also simply referred to as coefficients hereinafter. The substantially ghost-free video signal is outputted from the transversal filter 112 to an external circuit (not shown) and also a waveform extracting circuit 114.

The waveform extracting circuit 114 extracts a waveform of the output signal of the transversal filter 112 which occurs during a predetermined period where a reference signal for ghost cancel is present but display information components are absent. For example, this period is one horizontal scanning period in a vertical blanking period. In general, the ghost cancel reference signal is a vertical sync signal, an edge of a wide bar pulse or a short pulse in a predetermined line in a vertical blanking period. In this embodiment, the ghost cancel reference signal is the rising edge of a wide bar pulse (the GCR signal S1 in FIG. 7).

An edge detector 116 detects a timing of the rising edge of a GCR signal (see the part (I) or (J) of FIG. 7) by processing the output signal from the waveform extracting circuit 114. Specifically, the edge detector 116 is designed so as to detect the central point of the rising edge of a GCR signal on the basis of a 1-sample or 2-sample differentiating process. The edge timing detected by the edge detector 116 is used by a subsequent stage as a time reference or a time position of the reference signal.

By using the fact that GCR signals are periodically extracted by the waveform extracting circuit 114 for respective fields or frames, a sync adder 118 adds the output signals from the waveform extracting circuit 114 and calculates an average of the output signals from the waveform extracting circuit 114 while adjusting the time positions of the output signals from the waveform extracting circuit 114 in response to the edge timings detected by the edge detector 116. In the case of GCR signals having a polarity and a waveform of the part (J) of FIG. 7, during the signal addition, the adder 118 inverts the polarity of the GCR signals. The operation of the sync adder 118 increases the S/N ratio in the waveform extraction or detection of the reference signal.

A waveform converter 120 differentiates the output signal from the sync adder 118 so that an average GCR signal such as shown in the part (I) or (J) will be converted into a short reference pulse S5 such as shown in the part (K) of FIG. 7. The reference pulse S5 is synchronous with the rising edge of a GCR signal of the part (I) of FIG. 7.

In the case where some ghost components still remain in the output signal from the transversal filter 112, the output signal from the waveform converter 120 contains a reference pulse S5 and its ghost S6 as shown in the part (L) of FIG. 7. The ghost S6 follows the reference pulse S5 by a delay time Tg.

A reference waveform generator 122 determines an original reference waveform S7 in advance and outputs a signal representing the original reference waveform S7. As shown in the parts (L) and (M) of FIG. 7, the original reference waveform S7 substantially agrees with the output reference pulse S5 from the waveform converter 120 in waveform and timing.

The timing signal generator 128 generates various timing signal on the basis of sync components of the input video signal. The timing signal generator 128 feeds one of the timing signals to the reference waveform generator 122. The reference waveform generator 122 outputs the signal of the reference waveform S7 at a timing determined by the timing signal fed from the timing signal generator 128.

A subtractor 124 calculates the difference between the output signals from the waveform converter 120 and the reference waveform generator 122 and outputs an error signal representing the difference between the output signals from the devices 120 and 122. Since the output signals from the devices 120 and 122 are digital and are composed of discrete digital values, the output signal from the subtracter 124 is a sequence of discrete digital error signals which will be referred to as an error signal sequence εn. The reference pulse S5 and the reference waveform S7 are canceled each other during the subtraction by the subtractor 124. Therefore, as shown in the part (N) of FIG. 7, essentially only a ghost S6 remains in the error signal sequence εn.

A coefficient setting circuit 126 determines a set of tap coefficients on the basis of the error signal sequence εn. The coefficient setting circuit 126 uses the output signal from the edge detector 116 as information of a reference position during the determination of the coefficients. For example, the determination of the coefficients are reiterated by referring to the following equation.

$$w_n^{(K+1)} = w_n^{(K)} - \alpha^{(K)} \epsilon_n^{(K)} \quad (8)$$

where $w_n^{(K+1)}$ denotes new coefficients; $w_n^{(K)}$ denotes previous coefficients; and $\alpha^{(K)}$ denotes a magnification which is smaller than "1" and which depends on "K". It should be noted that the magnification may be constant independent of "K". In this way, the new coefficients are determined on the basis of the previous coefficients and the error signal sequence εn by an updating process.

The transversal filter 112 receives the output signal from the coefficient setting circuit 126 which represents the calculated coefficients. The transversal filter 112 processes the input video signal with the filtering characteristic which is determined by the calculated coefficients fed from the coefficient setting circuit 126.

Figure 10:
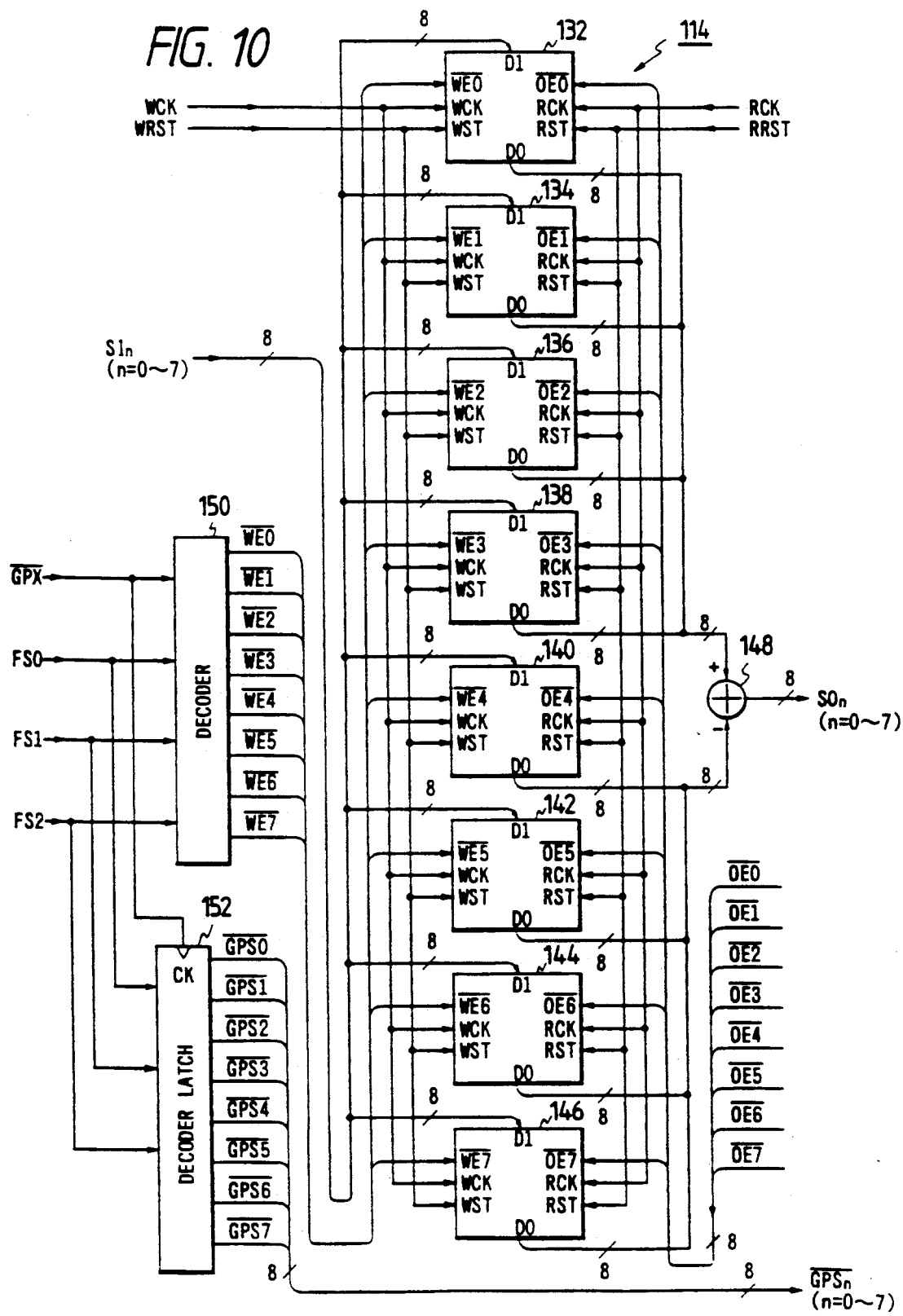
FIG. 10 is a block diagram of the waveform extracting circuit of FIG. 9.

As shown in FIG. 10, the waveform extracting circuit 114 includes eight FIFO-type (first in first out type) line memories 132-146 capable of storing an amount of data corresponding to a 1-line part of the video signal. Reference signal line data of the first to the eighth fields F1-F8 (see the parts (A)-(H) of FIG. 7) are sequentially stored into the line memories 132-146 respectively. Writing data into the line memories 132-146 is controlled by a write clock signal WCK, a write reset signal WRST, and write enable signals $\overline{WEn}$ (n=0~7). Reading data from the line memories 132-146 are controlled by a read clock signal RCK, a read reset signal RRST, and output enable signals $\overline{OEn}$ (n=0~7). The write clock signal WCK, the write reset signal WRST, the read clock signal RCK, and the read reset signal RRST are fed from the timing signal generator 128.

Reference signal line data SIn (n=0~7) are fed to data input terminals DI of the line memories 132-146. Reference signal line data are read out from the line memories 132-146 via their data output terminals DO.

The output data from the line memories 132, 134, 136, and 138 are fed to the plus input terminal of a subtracter 148. The output data from the line memories 140, 142, 144, and 146 are fed to the minus input terminal of the subtracter 148. The subtracter 148 sequentially executes subtraction between the data of the first field F1 and the data of the fifth field F5, subtraction between the data of the second field F2 and the data of the sixth field F6, subtraction between the data of the third field F3 and the data of the seventh field F7, and subtraction between the data of the fourth field F4 and the data of the eighth field F8.

The data are sequentially written into the line memories 132-146. The write enable signals $\overline{WEn}$ sequentially selects one of the line memories 132-146 into which the data are written. The data are sequentially read from the line memories 132-146. The output enable signals $\overline{OEn}$ sequentially selects one of the line memories 132-146 from which the data are read.

The write enable signals $\overline{WEn}$ are generated by a decoder 150. The decoder 150 receives field information signals FS0, FS1, and FS2 which have waveforms such as shown in the parts (A)-(C) of FIG. 11. In addition, the decoder 150 receives a reference designation signal $\overline{GPX}$. The field information signals FS0, FS1, and FS2, and the reference designation signal $\overline{GPX}$ are fed from the timing generator 128. As shown in the part (D) of FIG. 11, the reference designation signal $\overline{GPX}$ is in an L-level state during a line of each field into which a reference signal is added. The decoder 150 generates the write enable signals $\overline{WEn}$ from the signals FS0, FS1, FS2, and $\overline{GPX}$ by executing the logic operations expressed in the following equations.

$$\overline{WE0} = \overline{FS0} \cdot \overline{FS1} \cdot \overline{FS2} \cdot \overline{GPX}$$

$$\overline{WE1} = FS0 \cdot \overline{FS1} \cdot \overline{FS2} \cdot \overline{GPX}$$

$$\overline{WE2} = \overline{FS0} \cdot FS1 \cdot \overline{FS2} \cdot \overline{GPX}$$

$$\overline{WE3} = FS0 \cdot FS1 \cdot \overline{FS2} \cdot \overline{GPX}$$

$$\overline{WE4} = \overline{FS0} \cdot \overline{FS1} \cdot FS2 \cdot \overline{GPX}$$

$$\overline{WE5} = FS0 \cdot \overline{FS1} \cdot FS2 \cdot \overline{GPX}$$

$$\overline{WE6} = \overline{FS0} \cdot FS1 \cdot FS2 \cdot \overline{GPX}$$

$$\overline{WE7} = FS0 \cdot FS1 \cdot FS2 \cdot \overline{GPX}$$

The write enable signals $\overline{WE0}$–$\overline{WE7}$ are fed to the line memories 132–146 respectively.

The field information signals FS0, FS1, and FS2, and the reference designation signal $\overline{GPX}$ are fed to a decoder latch circuit 152 having latches at its output side. The decoder latch circuit 152 decodes the field information signals FS0, FS1, and FS2 into read timing signals $\overline{GPSn}$ (n=0~7) which are latched at timings determined by the rising edges of the reference designation signal $\overline{GPX}$.

Figure 11A:
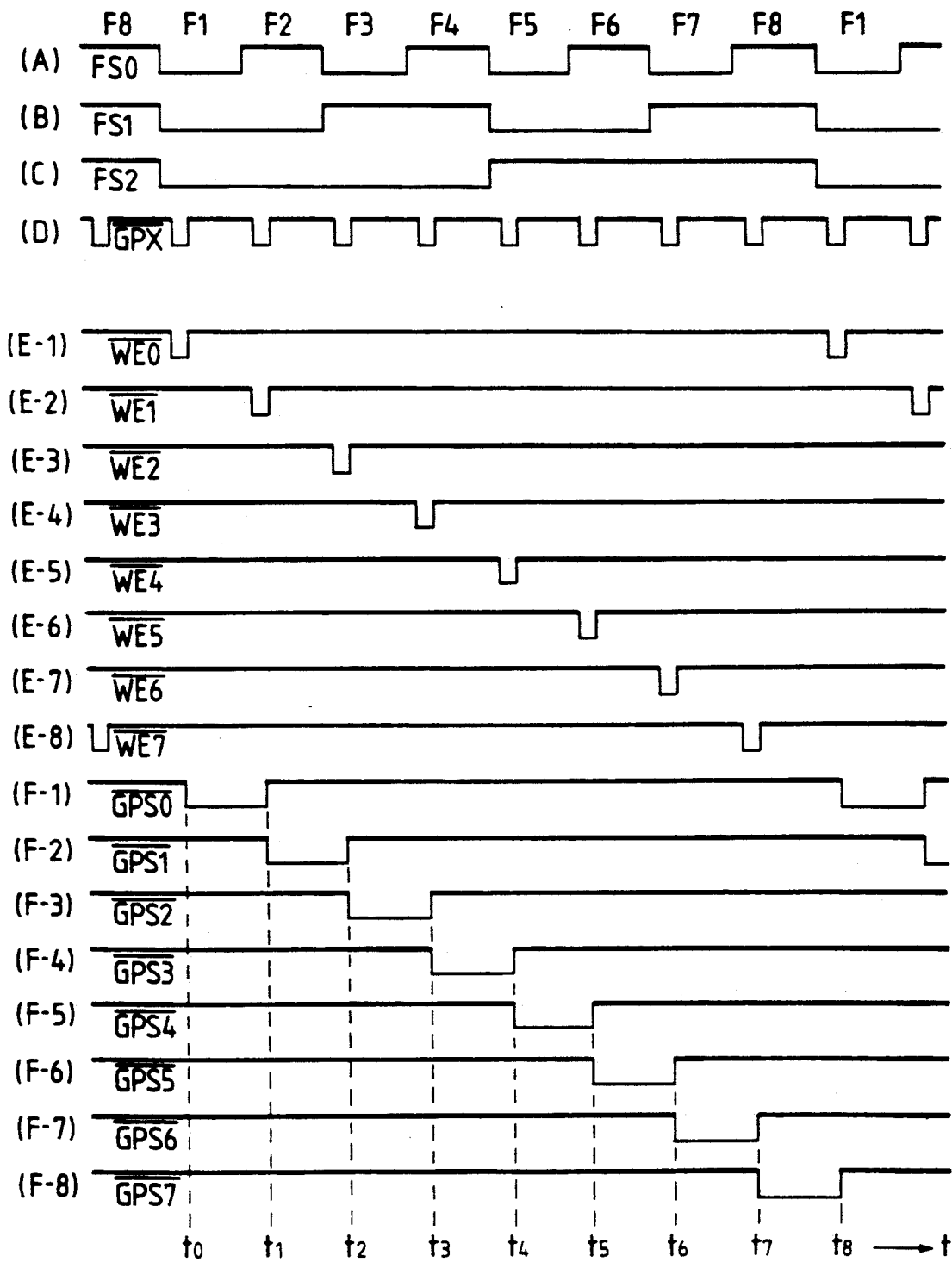

The read timing signals $\overline{GPSn}$ have waveforms such as shown in the parts (F-1)–(F-8) of FIG. 11. For example, the L-level period of the read timing signal $\overline{GPS0}$ (see the part (F-1) of FIG. 11) agrees with the 1-field interval starting from the moment t0 at which the writing of the reference signal of the first field F1 into the line memory 132 is ended. The read timing signals $\overline{GPS1}$ to $\overline{GPS7}$ have similar relations with the line memories 134–146 respectively.

A suitable logic circuit (not shown) generates the output enable signals $\overline{OEn}$ from the read timing signals $\overline{GPSn}$. The logic circuit may be in common to the timing signal generator 128. The operation of the logic circuit can be changed between a normal-speed reading mode and a high-speed reading mode via a manual switch (not shown).

During the normal-speed reading mode, the output enable signals $\overline{OE0}$–$\overline{OE7}$ have waveforms such as shown in the parts (G-1)–(G8) of FIG. 11. Specifically, the output enable signals $\overline{OE0}$ and $\overline{OE4}$ are generated by the AND operation between the read timing signals $\overline{GPS0}$ and $\overline{GPS4}$. The output enable signals $\overline{OE1}$ and $\overline{OE5}$ are generated by the AND operation between the read timing signals $\overline{GPS1}$ and $\overline{GPS5}$. The output enable signals $\overline{OE2}$ and $\overline{OE6}$ are generated by the AND operation between the read timing signals $\overline{GPS2}$ and $\overline{GPS6}$. The output enable signals $\overline{OE3}$ and $\overline{OE7}$ are generated by the AND operation between the read timing signals $\overline{GPS3}$ and $\overline{GPS7}$.

During the high-speed reading mode, output enabling signals as shown in FIG. 11 (H-1)–(H-8) are used for data reading.

A conceivable device for generating such waveforms contains a clock pulse counter, an R-S flip-flop and delaying circuits. The counter starts clock counting at the trailing edge of the read timing signal $\overline{GPS0}$ and outputs a trigger signal to the R-S flip-flop after one line period. The R-S flip-flop is set by the trailing edge of $\overline{GPS0}$ and reset by the trigger signal, and then outputs the output enabling signal $\overline{OE0}$ (=$\overline{OE4}$) as shown in FIG. 11 (H-1). This output signal is delayed for one line period in the delaying circuits successively, thus the output enabling signals $\overline{OE1}$–$\overline{OE3}$ ($\overline{OE5}$–$\overline{OE7}$) are obtained.

The waveform extracting circuit 114 of FIG. 10 operates as follows. The data of the reference signal line of the first to the eighth fields are sequentially written into the line memories 132–146 at timings determined by the L-level states of the write enable signals $\overline{WE0}$–$\overline{WE7}$ respectively. Specifically, when the write enable signals $\overline{WE0}$–$\overline{WE7}$ change to the L-levels, the write reset pulse signal WRST is fed to the line memories 13214 146 to reset the write counters in the line memories 132–146 respectively. Then, the data are sequentially written into the storage locations of the line memories 132–146 at timings determined by the write clock signal WCK. As a result, eight sets of the 1-line reference signal data are sequentially stored into the line memories 132–146 respectively. This data storing process is reiterated at a period corresponding to eight fields.

During the normal-speed reading mode, the reference signal data are read from the line memories 132–146 at timings determined by the L-level states of the output enable signals $\overline{OE0}$–$\overline{OE7}$ (see the parts (G-1)–(G-8) of FIG. 11) respectively, and are then applied to the subtracter 148. Specifically, when the output enable signals $\overline{OE0}$–$\overline{OE7}$ change to the L-levels, the read reset pulse signal RRST is fed to the line memories 132–146 to reset the read counters in the line memories 132–146 respectively. Then, the data are sequentially read from the storage locations of the line memories 132–146 at timings determined by the read clock signal RCK. As a result, eight sets of the 1-line reference signal data are read from the line memories 132–146 respectively. The timing of the reading of the data from the line memory 132 is equal to the timing of the reading of the data from the line memory 140. The timing of the reading of the data from the line memory 134 is equal to the timing of the reading of the data from the line memory 142. The timing of the reading of the data from the line memory 136 is equal to the timing of the reading of the data from the line memory 144. The timing of the reading of the data from the line memory 138 is equal to the timing of the reading of the data from the line memory 146.

The subtracter 148 sequentially executes subtraction between the data of the first field F1 and the data of the fifth field F5, subtraction between the data of the second field F2 and the data of the sixth field F6, subtraction between the data of the third field F3 and the data of the seventh field F7, and subtraction between the data of the fourth field F4 and the data of the eighth field F8. These subtractions cancel the horizontal sync signals S2 and the burst signals S3 (see FIG. 7). As a result, the subtracter 148 sequentially outputs GCR signals SOn (n=0~7) shown in the part (I) or (J) of FIG. 7. The GCR signals SOn are fed to the edge detector 116 and the sync adder 118.

During the high-speed reading mode, the reference signal data are read from the line memories 132–146 at timings determined by the L-level states of the output enable signals $\overline{OE0}$–$\overline{OE7}$ (see the parts (H-1)–(H-8) of FIG. 11) respectively. In this case, one cycle of the reading of the data from the line memories 132–146 is completed in a period of one field which equals one fourth of the corresponding period in the normal-speed reading mode.

In the case where some of the devices in this embodiment are formed by a microcomputer or a CPU, the high-speed reading mode is effective for the following reason. The high-speed reading mode enables a decrease in the data reading time. The decrease in the data reading time causes an increase in the time which can be spent by the microcomputer or the CPU for data processing.

DESCRIPTION OF THE THIRD PREFERRED EMBODIMENT

Figure 12:
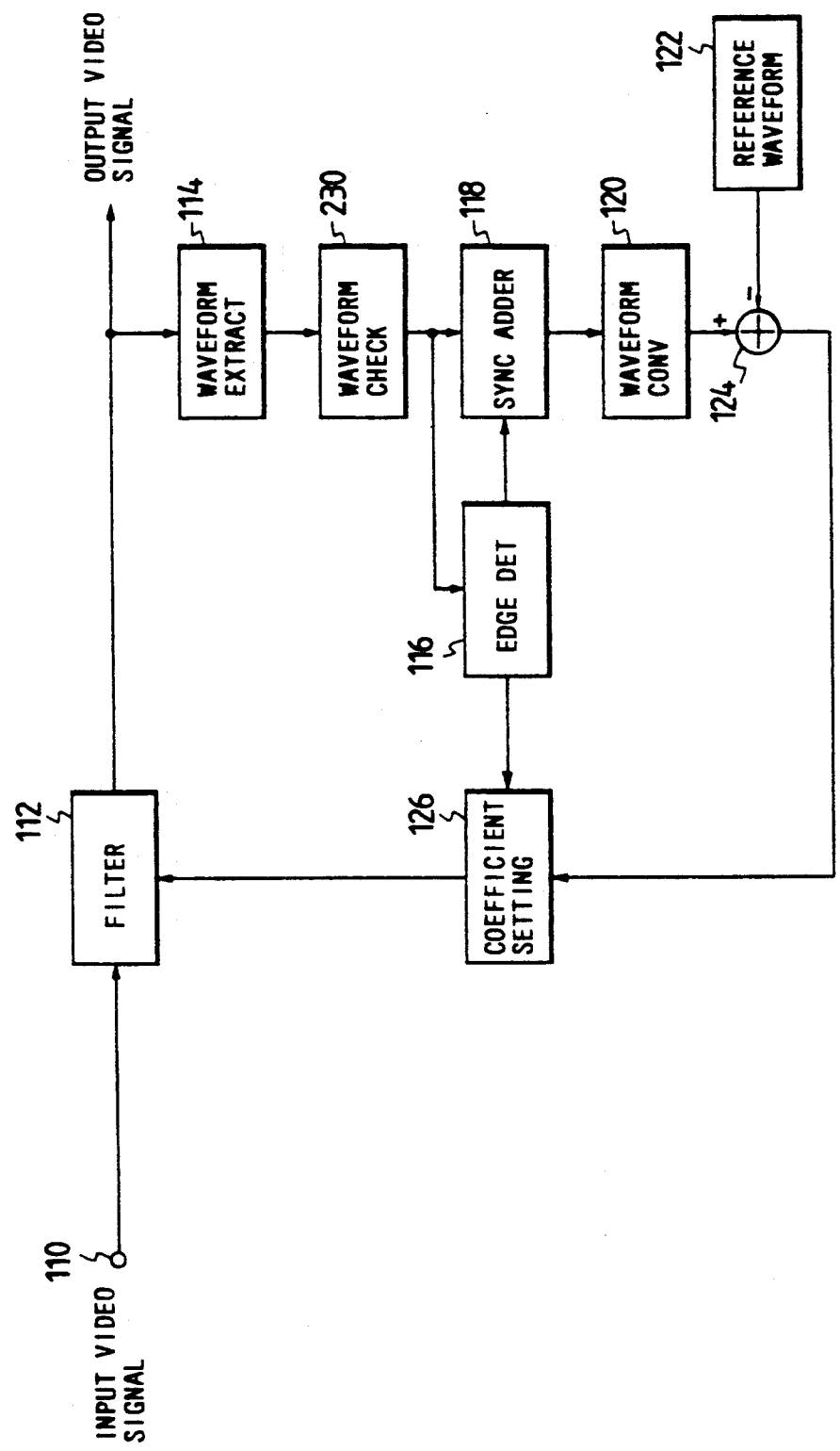
FIG. 12 is a block diagram of a waveform distortion removing apparatus according to a third embodiment of this invention.

FIG. 12 shows a third embodiment of this invention which is similar to the embodiment of FIGS. 7–11 except that a waveform check circuit 230 is added. The waveform check circuit 230 is connected between a waveform extracting circuit 114 and a sync adder 118, and between the waveform extracting circuit 114 and an edge detector 116. The waveform check circuit 230 detects an unreliable output signal from the waveform extracting circuit 114 and inhibits the transmission of the unreliable signal to the edge detector 116 and the sync adder 118. The waveform check circuit 230 passes only a reliable output signal from the waveform extracting circuit 114 to the edge detector 116 and the sync adder 118. This operation of the waveform check circuit 230 enables an increase in the reliability of ghost cancel.

Figure 13:
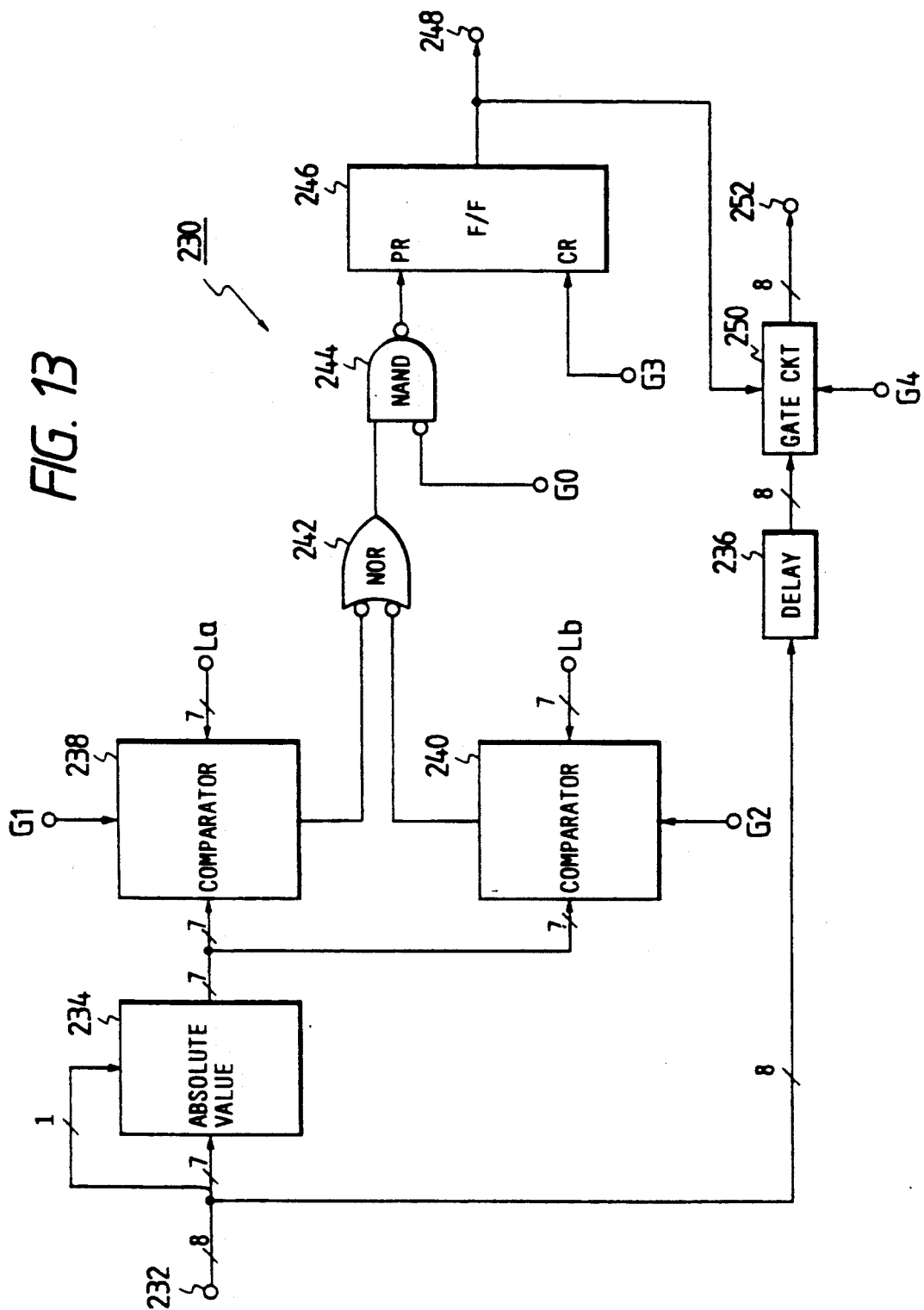
FIG. 13 is a block diagram of the waveform check circuit of FIG. 12.

As shown in FIG. 13, the waveform check circuit 230 includes an input terminal 232 via which an 8-bit output signal from the waveform extracting circuit 114 is transmitted to an absolute value circuit 234 and a delay circuit 236.

The absolute value circuit 234 includes seven EXCLUSIVE-OR gates of the 2-input type. The MSB of the output signal from the waveform extracting circuit 114 is applied in common to first input terminals of the EXCLUSIVE-OR gates. The remaining seven bits of the output signal from the waveform extracting circuit 114 are applied to second input terminals of the EXCLUSIVE-OR gates respectively. When the output signal from the waveform extracting circuit 114 represents a negative value, that is, when the MSB is "1", the remaining seven bits are inverted by the absolute value circuit 234 and the inverted bits are outputted from the absolute value circuit 234. This inverting operation of the absolute value circuit 234 corresponds to the conversion of a negative GCR bar waveform of the part (B) of FIG. 14 into a positive GCR bar waveform of the part (A) of FIG. 14. When the output signal from the waveform extracting circuit 114 represents a positive value, that is, when the MSB is "0", the remaining seven bits are passed through the absolute value circuit 234 without undergoing any state change.

A comparator 238 receives the output signal from the absolute value circuit 234. The comparator 238 also receives a given signal representing a predetermined value La (see FIG. 14). The comparator 238 compares the value represented by the output signal from the absolute value circuit 234 with the predetermined value La. The predetermined value La is chosen so that the comparator 238 can detect a burst signal of a significant level which remains in the output signal from the waveform extracting circuit 114 (see the part (D) of FIG. 14). The comparator 238 is selectively enabled and disabled by a control signal G1. Specifically, the comparator 238 is enabled when the control signal G1 is in an L-level state. As shown in the part (F) of FIG. 14, during the interval between the moments ta and tb where a burst signal is present, the control signal G1 is in the L-level state and thus the comparator 238 is enabled.

A comparator 240 receives the output signal from the absolute value circuit 234. The comparator 240 also receives a given signal representing a predetermined value Lb (see FIG. 14). The comparator 240 compares the value represented by the output signal from the absolute value circuit 234 with the predetermined value Lb. The predetermined value Lb is chosen so that the comparator 240 can detect an omission of a GCR bar waveform from the output signal of the waveform extracting circuit 114 (see the part (D) of FIG. 14). The comparator 240 is selectively enabled and disabled by a control signal G2. Specifically, the comparator 240 is enabled when the control signal G2 is in an L-level state. As shown in the part (G) of FIG. 14, during the interval between the moments tc and td where a GCR bar waveform is present, the control signal G2 is in the L-level state and thus the comparator 240 is enabled.

The output signals from the comparators 238 and 240 are applied to first and second input terminals of a NAND gate 242. The output signal from the NAND gate 242 is applied to a first input terminal of a NAND gate 244. A control signal G0 is applied to a second input terminal of the NAND gate 244 via an inverter. As shown in the part (E) of FIG. 14, the control signal G0 is in an L-level state during an interval covering the periods for which the comparators 238 and 240 are enabled. The output signal from the NAND gate 244 is applied to a preset terminal of a flip-flop 246. A control signal G3 is applied to a clear terminal of the flip-flop 246. As shown in the part (H) of FIG. 14, the control signal G3 is generated in response to the leading edge of a pulse of the control signal G0. The output signal from the flip-flop 246 is fed to an output terminal 248 and a gate circuit 250.

The delay circuit 236 delays the output signal from the waveform extracting circuit 114 by a time which agrees with the signal delay time caused in the part of the waveform check circuit 230 from the absolute value circuit 234 to the flip-flop 246. The output signal from the delay circuit 236 is applied to the gate circuit 250. A control signal G4 is applied to the gate circuit 250. The control signal G4 has a waveform such as shown in the part (I) of FIG. 14. The output signal from the gate circuit 250 is fed to an output terminal 252. Only when both of the control signal G4 and the output signal from the flip-flop 246 are in L-level states, the gate circuit 250 passes the output signal from the delay circuit 236 to the output terminal 252. Otherwise, the gate circuit 250 blocks the advance of the output signal from the delay circuit 236 to the output terminal 252.

To cancel burst signals and sync signals, the waveform extracting circuit 114 executes subtraction between the reference data separated by periods of 4 fields. Jitter components in the video signal, a disturbance in the video signal which is caused by a display information scene change, foreign pulse noises, and other undesirable factors adversely affect clock signals and a sync system, making it difficult to accurately maintain the 4-field periods in the subtraction in the waveform extracting circuit 114. Accordingly, the cancel of the burst signals and the sync signals are sometimes insufficient. For example, in these cases, as shown in the part (C) of FIG. 14, a burst signal S7 of a significant level remains in the output signal from the waveform extracting circuit 114 or sharp pulses S8 being images of a sync signal remain in the output signal from the waveform extracting circuit 114. In addition, in these cases, a GCR bar waveform is sometimes omitted from the waveform extracting circuit 114. In such cases, the output signal from the waveform extracting circuit 114 is unreliable and it is rejected by the waveform check circuit 230.

The operation of the waveform check circuit 230 will be further described hereinafter. In the case where the cancel of burst signals and sync signals is well performed in the waveform extracting circuit 114, a remaining burst signal S7 (see the part (C) of FIG. 14) is absent from the output signal of the absolute value circuit 234 and the GCR bar waveform in the output signal of the absolute value circuit 234 is correct during the interval between the moments tc and td. Thus, the output signals from the comparators 238 and 240 are in H-level states so that the output signal from the NAND gate 242 in an L-level state. In this case, the output signal from the NAND gate 244 is in an H-level state. As a result, the flip-flop 246 keeps prevented from being preset and the output signal from the flip-flop 246 remains in an L-level state. Thus, during the period where the control signal G4 is in an L-level state, the gate circuit 250 is open so that the output signal from the delay circuit 236 passes through the gate circuit 250 and reaches the output terminal 252. The delay circuit 236 delays the output signal from the waveform extracting circuit 114 by a time $T_D$ (see the part (J) of FIG. 14. As a result, a delayed correct GCR bar waveform of the part (J) of FIG. 14 is transmitted to the edge detector 116 and the sync adder 118 via the output terminal 252.

In the case where the cancel of burst signals is insufficient so that a burst signal S7 of a significant level remains in the output signal from the waveform extracting circuit 114 as shown in the part (C) of FIG. 14, the output signal from the comparator 238 is in an L-level state. Thus, the output signal from the NAND gate 242 is in an H-level state and the output signal from the NAND gate 244 is in an L-level state. In addition, the flip-flop 246 is preset and its output signal is in an H-level state. As a result, the gate circuit 250 is closed, and the output signal from the delay circuit 236 is inhibited from reaching the output terminal 252. In this way, an unreliable GCR bar waveform is rejected and is inhibited from traveling to the edge detector 116 and the sync adder 118 via the output terminal 252.

In the case where a GCR bar waveform is omitted from the output signal from the waveform extracting circuit 114, the output signal from the comparator 240 is in an L-level state. Thus, the output signal from the NAND gate 242 is in an H-level state and the output signal from the NAND gate 244 is in an L-level state. In addition, the flip-flop 246 is preset and its output signal is in an H-level state. As a result, the gate circuit 250 is closed, and the output signal from the delay circuit 236 is inhibited from reaching the output terminal 252. In this way, an unreliable GCR bar waveform is rejected and is inhibited from traveling to the edge detector 116 and the sync adder 118 via the output terminal 252.

As understood from the previous description, the H-level output signal from the flip-flop 246 represents the occurrence of an undesirable condition. In the occurrence of an undesirable condition, a coefficient setting circuit 126 forces magnifications $\alpha^{(K)}$ to "0" in response to the H-level output signal from the flip-flop 246 to interrupt sequential calculations of tap coefficients. Also, the operation of the sync adder 118 may be suspended in response to the H-level output signal from the flip-flop 246.

DESCRIPTION OF THE FOURTH PREFERRED EMBODIMENT

When the ghost canceler is switched on or a channel is changed, the ghost canceler starts the operation of ghost cancelling from its initial state, therefore it takes a lot of times to complete the operation. In these periods, the output signal from the ghost canceler becomes unstable. Thus, it is desirable for avoiding such instability that the input signal to the ghost canceler is directly outputted to an external device (for example, an image reproducing device, not shown) until the end of the operation.

Figure 15:
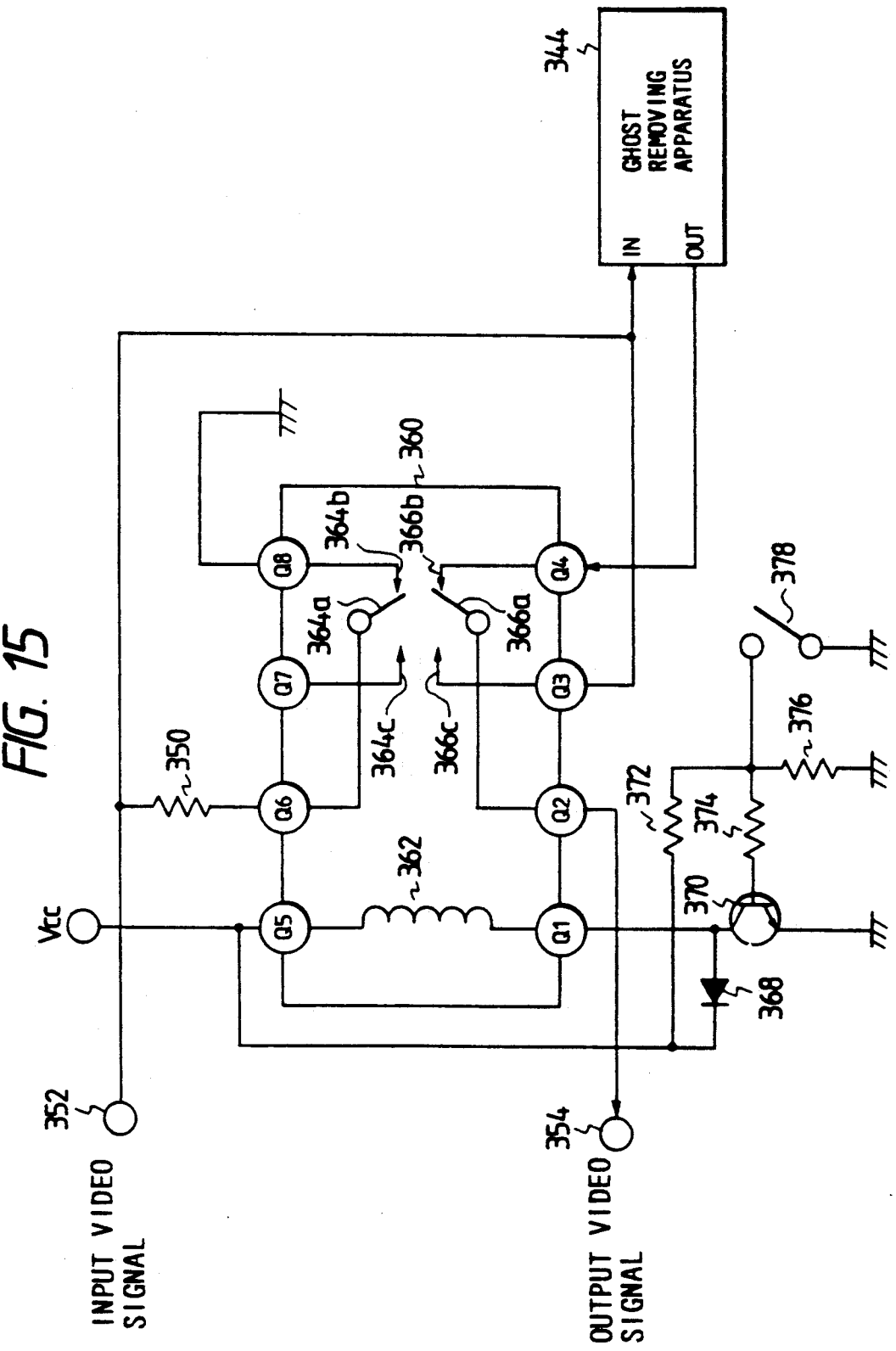
FIG. 15 is a diagram of an apparatus according to a fourth embodiment of this invention.

For this purpose, a relay circuit as shown in FIG. 15 is provided.

With reference to FIG. 15, the relay circuit 360 includes terminals Q1-Q8. In the relay circuit 360, a relay winding 362 is connected between the terminals Q1 and Q5. In addition, a first set of a movable contact 364a and fixed contacts 364b and 364c are connected to the terminals Q6, Q8, and Q7 respectively while a second set of a movable contact 366a and fixed contacts 366b and 366c are connected to the terminals Q2, Q4, and Q3 respectively.

A diode 368 is connected between the terminals Q1 and Q5 to absorb a reaction pulse induced across the relay winding 362. The collector of an NPN transistor 370 is connected to the terminal Q1. The transistor 370 serves as a switch for controlling energization and deenergization of the relay winding 362. The emitter of the transistor 370 is grounded. The base of the transistor 370 is connected to the ground via a bias resistor 374 and a switch 378. A bias resistor 376 is connected in parallel with the switch 378. One end of a bias resistor 372 is connected to the terminal Q5, and the other end of the bias resistor 372 is connected to the junction between the bias resistors 374 and 376.

The terminal Q2 is connected to a video signal output terminal 354. The terminal Q3 is connected to a video signal input terminal 352 and also an input terminal of a ghost removing apparatus 344. Thus, the input terminal of the ghost removing apparatus 344 is connected to the video input terminal 352. The terminal Q4 is connected to an output terminal of the ghost removing apparatus 344. The terminal Q5 is connected to a positive terminal of a dc power source Vcc whose negative terminal is grounded. The terminal Q6 is connected to a video signal input terminal 352 via a matching resistor 350. The terminal Q7 is open. The terminal Q8 is grounded.

The ghost removing apparatus 344 is composed of one of the waveform distortion removing apparatuses of the embodiments of FIGS. 1-14 or one of known ghost cancelers. The ghost removing apparatus 344 is activated by the dc power source Vcc.

When the switch 378 is open, a base current flows through the transistor 370 so that the transistor 370 becomes conductive. Thus, the relay winding 362 is energized by the dc power source Vcc, and the movable contacts 364a and 366a connect with the fixed contacts 364b and 366b respectively. As a result, the end of the matching resistor 50 is grounded via the relay circuit 360, and the output terminal of the ghost removing apparatus 344 is connected to the video output terminal 354 via the relay circuit 360. In this case, a video signal fed to the ghost removing apparatus 344 via the input terminal 352 is processed by the ghost removing apparatus 344 while the output signal from the ghost removing apparatus 344 is transmitted to an external device (not shown) via the output terminal 354. In addition, the matching resistor 350 is enabled so that good matching is established between the ghost removing apparatus 344 and an external device (not shown) outputting the video signal to the ghost removing apparatus 344.

When the switch 378 is closed, the flow of a base current through the transistor 370 is inhibited so that the transistor 370 becomes non-conductive. Thus, the relay winding 362 is deenergized, and the movable contacts 364a and 366a connect with the fixed contacts 364c and 366c respectively. As a result, the end of the matching resistor 50 is disconnected from the ground by the relay circuit 360, and the output terminal of the ghost removing apparatus 344 is disconnected from the video output terminal 354 by the relay circuit 360. In addition, the video signal fed via the video signal input terminal 352 to the ghost removing apparatus 344, is directly transmitted to the video signal output terminal 354 by the relay circuit 360. Thus, the input video signal is transmitted to an external device (not shown) via the output terminal 354 without undergoing any aforementioned instability of the ghost removing apparatus 344. In addition, the matching resistor 350 is disabled. It should be noted that external devices generally have matching resistors.

When the feed of an electric power from the dc power source Vcc to the relay circuit 360 and the ghost removing circuit 344 is cut off, the relay winding 362 is deenergized independent of the position of the switch 378 and the ghost removing apparatus 344 is deactivated. In this case, there occurs operation similar to the operation which occurs upon closing the switch 378.

What is claimed is:

1. A waveform distortion removing apparatus for processing a video signal having a reference line signal containing a ghost cancel component, wherein the reference line signal periodically occurs for each field and a state of the reference line signal periodically varies at a period of a predetermined number of fields, the apparatus comprising a digital filter having taps and being controlled in response to tap coefficients, means for extracting the reference line signal from the video signal, and means for setting the top coefficients in response to the extracted reference line signal;

the improvement wherein the extracting means comprises:
a predetermined number of memories, wherein the number of the memories is equal to the number of the fields composing one period of the variation in the state of the reference line signal;
means for sequentially writing the reference line signals of the fields composing one period into the memories respectively; and
means for reading the reference line signals from the memories.

2. A waveform distortion removing apparatus for processing a video signal having a ghost cancel reference signal which periodically occurs, the apparatus comprising a digital filter having taps and being controlled in response to tap coefficients, means for extracting the reference signal from the video, and means for setting the tap coefficients in response to the extracted reference signal;

the improvement comprising:
means for detecting an abnormality of the extracted reference signal; and
means for suspending an operation of the coefficient setting means when the detecting means detects an abnormality of the extracted reference signal.

3. A waveform distortion removing apparatus as recited in claim 2, wherein the reference line signal periodically occurs for each field and state of the reference line signal periodically varies at a period of a predetermined number of fields, and
said extracting means extracts from said video signal reference line signals for said predetermined number of fields comprising one period.

4. An apparatus comprising:
an input terminal subjected to a video signal;
an output terminal;
a ghost canceler for removing ghost components from a video signal inputted thereinto;
first means changeable between a first state and a second state, said first means operating in said first state for transmitting the video signal from the input terminal to the ghost canceler and for transmitting an output signal from the ghost canceler to the output terminal, and operating in said second state for transmitting the video signal from the input terminal to the output terminal and to the ghost canceler and for inhibiting transmission of the output signal from the ghost canceler to the terminal, and
second means for changing the first means between the first state and the second state,
the apparatus further comprising a matching resistor, and means for connecting the matching resistor to the input terminal when the first means is in the first state.

* * * * *